United States Patent
Eichholz (10) Patent No.: US 7,095,186 B2
(45) Date of Patent: Aug. 22, 2006

(54) CONTROL CIRCUIT FOR CONTROLLING AN ELECTRON-EMITTING DEVICE

(75) Inventor: Jörg Eichholz, Warringholz (DE)

(73) Assignee: Fraunhofer-Gesellschaft zur Foerderung der angewandte Forschung e.V., Munich (DE)

( * ) Notice: Subject to any disclaimer, the term of this patent is extended or adjusted under 35 U.S.C. 154(b) by 0 days.

(21) Appl. No.: 11/070,741

(22) Filed: Mar. 1, 2005

(65) Prior Publication Data

US 2005/0147148 A1 Jul. 7, 2005

Related U.S. Application Data

(63) Continuation of application No. PCT/EP03/09486, filed on Aug. 27, 2003.

(30) Foreign Application Priority Data

Sep. 4, 2002 (DE) .............................. 102 40 885
Sep. 6, 2002 (DE) .............................. 102 41 433

(51) Int. Cl.
*G05F 1/00* (2006.01)
(52) U.S. Cl. .................. 315/291; 315/169.3; 315/307; 315/209 R; 345/74.1; 345/212; 378/109; 378/114
(58) Field of Classification Search .. 315/169.1–169.3, 315/291, 307, 209 R; 378/108, 109, 113, 378/114; 345/74.1, 212; 372/74; 438/20, 438/28
See application file for complete search history.

(56) References Cited

U.S. PATENT DOCUMENTS

| 4,181,857 | A | | 1/1980 | Miyoshi |
| 4,990,766 | A | * | 2/1991 | Simms et al. ......... 250/214 VT |
| 5,656,892 | A | | 8/1997 | Zimlich et al. |
| 5,936,597 | A | | 8/1999 | Hyun et al. |
| 5,982,082 | A | * | 11/1999 | Janning ...................... 313/336 |
| 6,020,864 | A | | 2/2000 | Bancal |
| 6,204,834 | B1 | | 3/2001 | Baker et al. |
| 6,392,355 | B1 | | 5/2002 | Palmer et al. |
| 2001/0016031 | A1 | | 8/2001 | Chomenky et al. |
| 2004/0238809 | A1 | * | 12/2004 | Adamec et al. ............... 257/10 |

FOREIGN PATENT DOCUMENTS

| JP | 03210798 | 9/1991 |
| WO | 00/60632 | 10/2000 |

* cited by examiner

*Primary Examiner*—Haissa Philogene
(74) *Attorney, Agent, or Firm*—Michael A. Glenn; Glenn Patent Group (57) ABSTRACT

A control circuit for controlling an electron-emitting device is formed to draw, with a voltage applied, an excitation current being related to a number of electrons emitted. The inventive control circuit includes a first determinator for determining whether an amount of charge transported by the excitation current has reached a predetermined charge threshold value, a second determinator for determining whether a magnitude of the excitation current has reached a predetermined current threshold value, and a switch for switching off the excitation current as soon as the first determinator determines that the amount of charge has reached a predetermined charge threshold value, or as soon as the second determinator determines that the magnitude of the excitation current is smaller than the predetermined current threshold value. The control circuit allows the usage of, for example, CNT arrays for irradiation and operates on the basis of the current drawn by the electron-emitting device, which makes possible a simple setup.

16 Claims, 5 Drawing Sheets

FIGURE 4B (transistor conducting)

FIGURE 4C (transistor blocking)

CONTROL CIRCUIT FOR CONTROLLING AN ELECTRON-EMITTING DEVICE

CROSS-REFERENCE TO RELATED APPLICATION

This application is a continuation of copending International Application No. PCT/EP03/09486, filed Aug. 27, 2003, which designated the United States and was not published in English, and is incorporated herein by reference in its entirety.

BACKGROUND OF THE INVENTION

1. Field of the Invention

The present invention relates to a control circuit for controlling an electron-emitting device. In particular, the present invention relates to a control circuit suitable for controlling so-called carbon nano tubes arranged in an array.

2. Description of Related Art

The production of ever smaller structural sizes on a substrate becomes increasingly important with the development of IC (integrated circuit) technology. One of the basic technologies for producing ICs is lithography where a resist deposited on the entire area of a wafer is exposed using a mask which is opaque or transparent at certain positions. For this, a light beam having a predetermined wavelength is produced, is focused by a special assembly using optical lenses employing the phenomenon of light refraction and is then directed to the wafer to expose the resist deposited there. The resolution obtainable by means of this technology depends on the light wavelength. The smaller the light wavelength, the smaller the structural sizes obtainable. The light wavelength, however, cannot be reduced at will because of optical transmission features of the lenses used for focusing the light. In order to generate ever smaller structures despite this physical limit, technologies must be employed where, for example, electrons instead of light are used for irradiating the resist.

Here, electrons are emitted by a suitable electron-emitting device, are focused suitably and directed to the wafer. Since only a very small resist area (pixel) can be exposed punctually on the basis of a single electron-emitting device, it is of advantage to unite several electron-emitting devices to an array to be able to expose greater resist areas at the same time and selectively so that the desired small structures can be produced faster than when using only one electron-emitting device. If, for example, a cathode-ray tube was used for emitting electrons, it would be obvious for a person skilled in the art that only very coarse structures can be generated with the necessarily great physical dimensions of such areas. This is why electron-emitting devices having small dimensions, such as, for example, carbon nano tubes mentioned above, must be used here.

Carbon nano tubes (CNTs) basically are several mostly cylindrical carbon elements having a diameter of several nanometers, which are arranged on a substrate and have a control electrode. If an electrical control voltage of, for example, several 10V is applied to this control electrode, the CNTs will draw an excitation current. The field formed at the tip of these carbon elements causes a field emission of electrons.

Due to the small dimensions, CNTs are of advantage because an array of electron beams with the help of which the desired small structures can be generated faster compared to a single electron beam, can be produced since a CNT array can irradiate several pixels on a wafer at a certain time.

It is, however, a precondition for obtaining the desired structures using a CNT array for each pixel to be exposed by a precise radiation dose which may neither be exceeded nor fall below a certain value. If the dose is too great, too large a structural point will be generated. If, however, the dose is too small, the required energy dose for exposing the resist will not be obtained, i.e. the resist will not be exposed at this position and no structural point or too small a structural point will result.

Due to the manufacturing problems connected to producing nano structures, a CNT array, however, comprises great deviation as regards the electron dose emitted in the array. The result is that a CNT array, apart from functional CNTs, will also comprise some CNTs emitting too small an electron dose. Additionally, it is conceivable for some of the CNTs arranged in the array to be defect and not to emit any electrons at all. If a CNT array is used for irradiating a wafer, no points at all or too small or too big points will be produced apart from the points having the desired size. Due to these manufacturing problems and, connected thereto, the small resolution obtainable, a usage of CNT arrays—even if desired, as explained above—has not been possible for the purpose of irradiation requiring a high resolution.

SUMMARY OF THE INVENTION

It is the object of the present invention to provide a control circuit and a method for controlling an electron-emitting device and an array for controlling a multi-electron-emitting device, enabling high-resolution irradiation.

In accordance with a first aspect, the present invention provides a control circuit for controlling an electron-emitting device formed to draw, with a voltage applied, an excitation current being related to a number of electrons emitted, having: first means for determining whether an amount of charge transported by the excitation current has reached a predetermined charge threshold value; second means for determining whether a magnitude of the excitation current has reached a predetermined current threshold value; and means for switching off the excitation current as soon as the first means determines that the amount of charge has reached a predetermined charge threshold value, or as soon as the second means determines that the magnitude of the excitation current is smaller than the predetermined current threshold value.

In accordance with a second aspect, the present invention provides a method for controlling an electron-emitting device formed to draw, with a voltage applied, an excitation current being related to a number of electrons emitted, having the steps of: determining whether an amount of charge transported by the excitation current has reached a predetermined charge threshold value; determining whether a magnitude of the excitation current has reached a predetermined current threshold value; and switching off the excitation current as soon as it is determined that the amount of charge has reached a predetermined charge threshold value, or as soon as it is determined that the magnitude of the excitation current is smaller than the predetermined current threshold value.

In accordance with a third aspect, the present invention provides an array for controlling a multi-electron-emitting device, the multi-electron-emitting device having a plurality of electron-emitting devices, having: a plurality of control circuits mentioned above, one control circuit being provided for one electron-emitting device; wherein an identification feature unambiguously identifying the electron-emitting device in this array is associated to each control circuit; and monitoring means for monitoring the plurality of control circuits formed to detect whether, in a control circuit, the magnitude of the excitation current has reached a predetermined threshold value; wherein the monitoring means is formed to effect a permanent deactivation of the control circuit on the basis of the identification feature.

The present invention is based on the finding that a high resolution is obtainable by an array for example consisting of CNTs, by providing the CNTs, individually or even in smaller groups including some CNTs, with a control circuit, wherein the control circuit unambiguously detects the electron dose emitted using an excitation current drawn by the CNTs to switch off the corresponding CNTs when a desired dose is reached. In addition, the magnitude of the excitation current is detected according to the invention to determine whether the corresponding CNTs are able to provide a sufficient dose within a predetermined interval. If the magnitude of the excitation current is too small, the inventive control circuit will deactivate the corresponding CNTs in order for no incomplete points etc to be generated on the wafer.

The amount of charge emitted by the CNTs depends on the magnitude of an excitation current drawn by the CNTs. The excitation current can thus be used for determining the amount of charge emitted by the CNTS. The effect that the charge transported by a current within a time interval can be determined from an integral with regard to the current flow within this time interval is made use of here. To determine whether a certain amount of charge has been emitted by the CNT, it is, however, sufficient to monitor whether this amount of charge has reached a predetermined charge threshold value. If this charge threshold value is reached, the CNTs can be switched off by switching off the excitation current. A proper function of the CNTs is also determined on the basis of the excitation current by monitoring whether the magnitude of the excitation current has reached a predetermined current threshold value. If this current threshold value is not reached, this will be equivalent to the fact that an amount of charge required for radiating the resist cannot be emitted by the CNT within a predetermined time interval. In this case, the CNTs can be deactivated by switching off the excitation current.

It is an advantage with the present invention that the control circuit for controlling the CNTs is formed on the basis of two measurable quantities, namely the magnitude of the excitation current and the amount of charge transported by the excitation current. According to an embodiment, respective comparators are employed to monitor whether the magnitude of the excitation current has reached a predetermined current threshold value and whether the amount of charge transported by the excitation current has reached a predetermined charge threshold value. Since the comparators are standard elements, the inventive control circuit can be realized at low cost.

Another advantage of the present invention is that both the magnitude of the excitation current and the amount of charge transported by the excitation current can be monitored in a particularly precise way since the excitation current itself need not necessarily be used for this. According to an embodiment, several auxiliary currents which are in a predetermined relation to the excitation current are generated using a current mirror. Both the magnitude of the excitation current and the amount of charge are monitored on the basis of these auxiliary currents without influencing the excitation current.

BRIEF DESCRIPTION OF THE DRAWINGS

Preferred embodiments of the present invention will be detailed subsequently referring to the appended drawings, in which.

DESCRIPTION OF THE PREFERRED EMBODIMENTS

Figure 1:
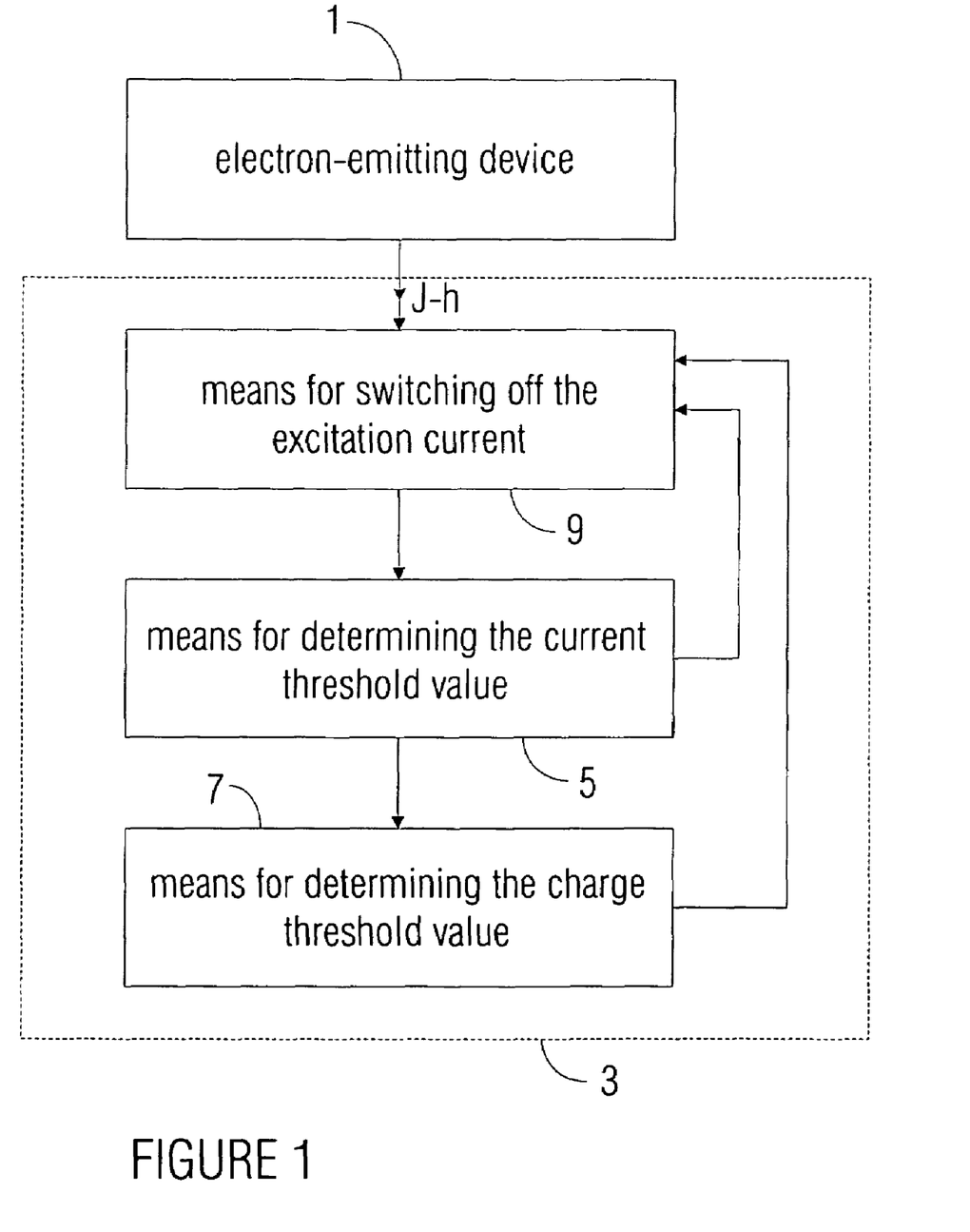
FIG. 1 shows the inventive control circuit for controlling an electron-emitting device.

FIG. 1 shows an assembly including an electron-emitting device 1 to be controlled by an inventive control circuit 3. The latter includes means 5 monitoring whether the magnitude of the excitation current 4 drawn by the electron-emitting device 1 exceeds a predetermined current threshold value. The control circuit 3 additionally includes means 7 monitoring whether the amount of charge emitted by the electron-emitting device exceeds a predetermined charge threshold value. The inventive control circuit for controlling an electron-emitting device further includes means 9 for switching off the excitation current with the help of which the electron-emitting device 1 is switched off by switching off the excitation current 4 in the case that the charge threshold value is exceeded or the value has fallen below the current threshold value. The means 9 for switching off the excitation current can be switched on again using another functionality not illustrated in FIG. 1 for, for example, a subsequent irradiation process so that the electron-emitting device 1 can again draw an excitation current and emit a charge.

Figure 2:
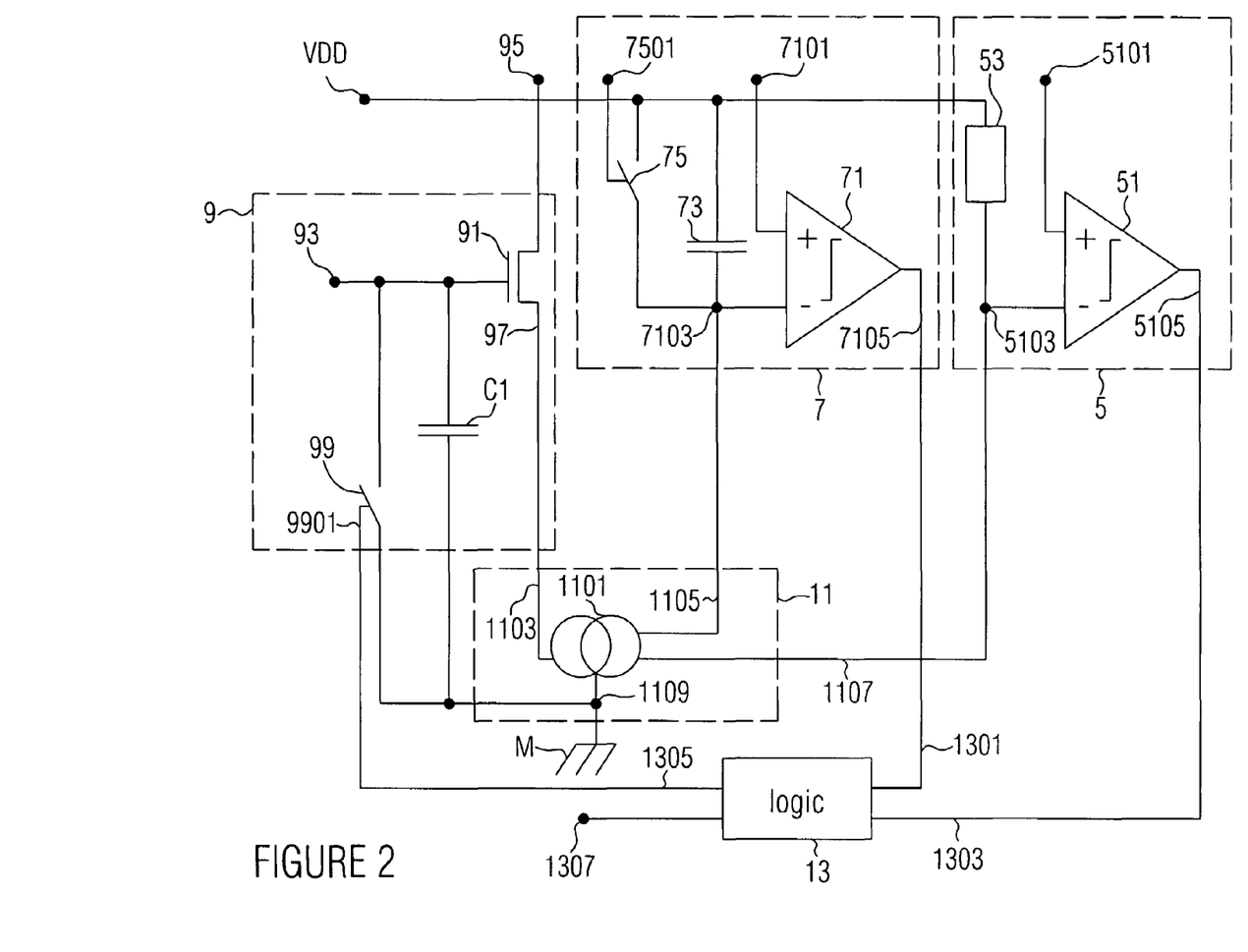
FIG. 2 shows an embodiment of the inventive control circuit.

FIG. 2 shows a preferred embodiment of the invention, wherein the means 9, the means 5 and the means 7 for determining the charge threshold value are marked in broken lines.

The means 9 for switching off the excitation current basically includes a transistor 91 which can be formed as a high-voltage transistor having a control input 93, an input 95 and an output 97. The input 95 of the transistor 91 is connected to a control electrode, not indicated in FIG. 2, of an electron-emitting device such that the excitation current, with regard to its technical current direction, can flow into this input—the electron-emitting device draws this excitation current with regard to its physical current direction.

Figure 4A:
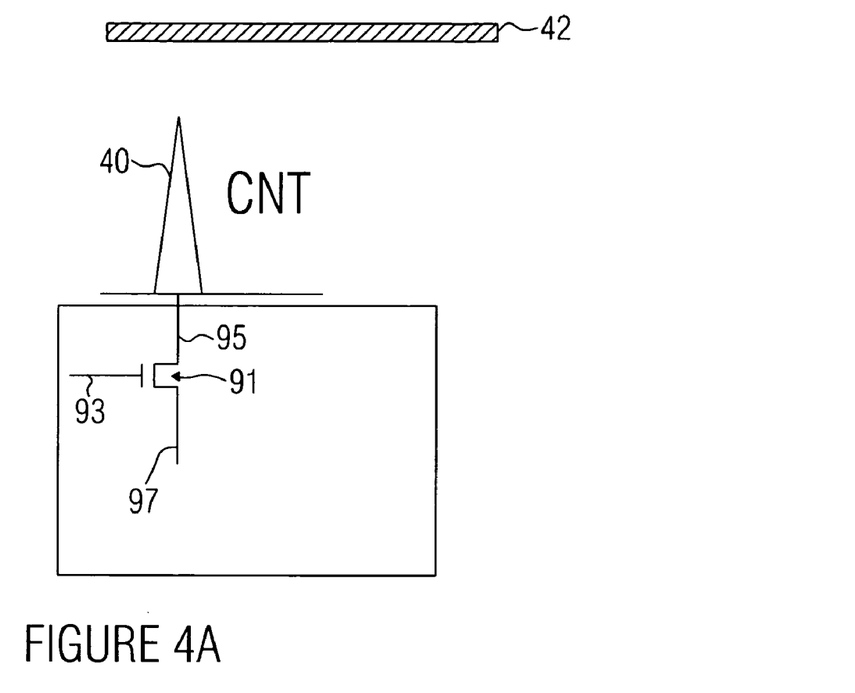
FIGS. 4a to 4c show a plot of the voltage and potential situations, respectively, between control circuit, carbon nano tube and substrate to be exposed.

FIG. 4a is a schematic illustration of the transistor 91 having a CNT 40 arranged in the vicinity of a substrate 42 to be exposed. The "remainder" of the control circuit is not illustrated in detail in FIG. 4a. Only exemplarily, it is assumed in the following that the transistor 91 is a self-blocking N-MOSFET.

The substrate to be exposed is raised to a potential with regard to ground of, for example, several 10 V up to +50 V, which corresponds to a typical operating voltage for CNTs.

Figure 4B:
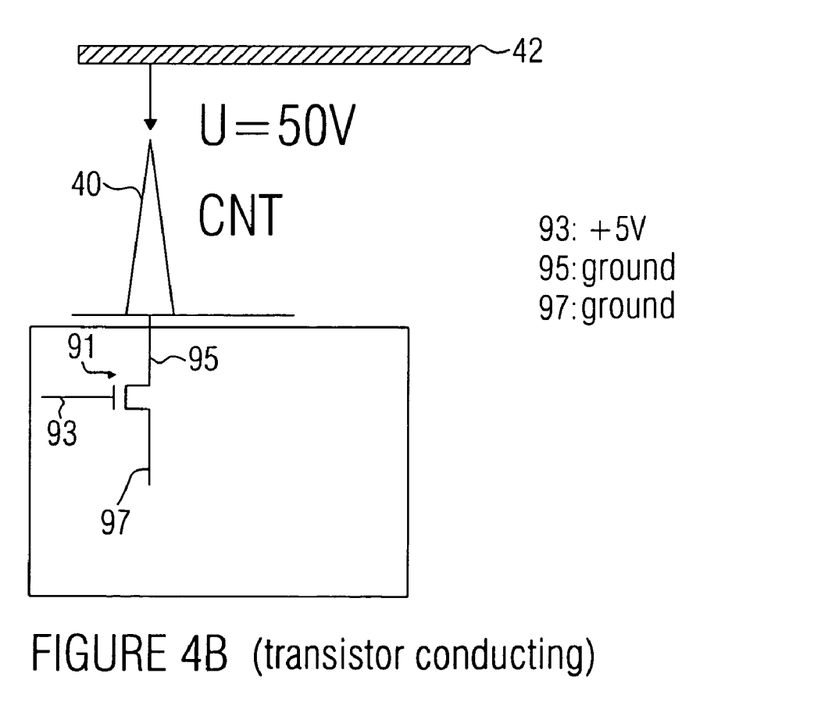

FIG. 4b shows the situation where a voltage to ground of +5 V is applied to the control input 93 of the transistor and the substrate 42 is at +50 V to ground. Due to the positive control voltage, the transistor 91 will conduct so that the voltage of +50 V drops between the substrate 42 and the top of the CNT, which results in a current to flow through the transistor and electrons to fly from the CNT onto the substrate, which is how the resist can be exposed.

Figure 4C:
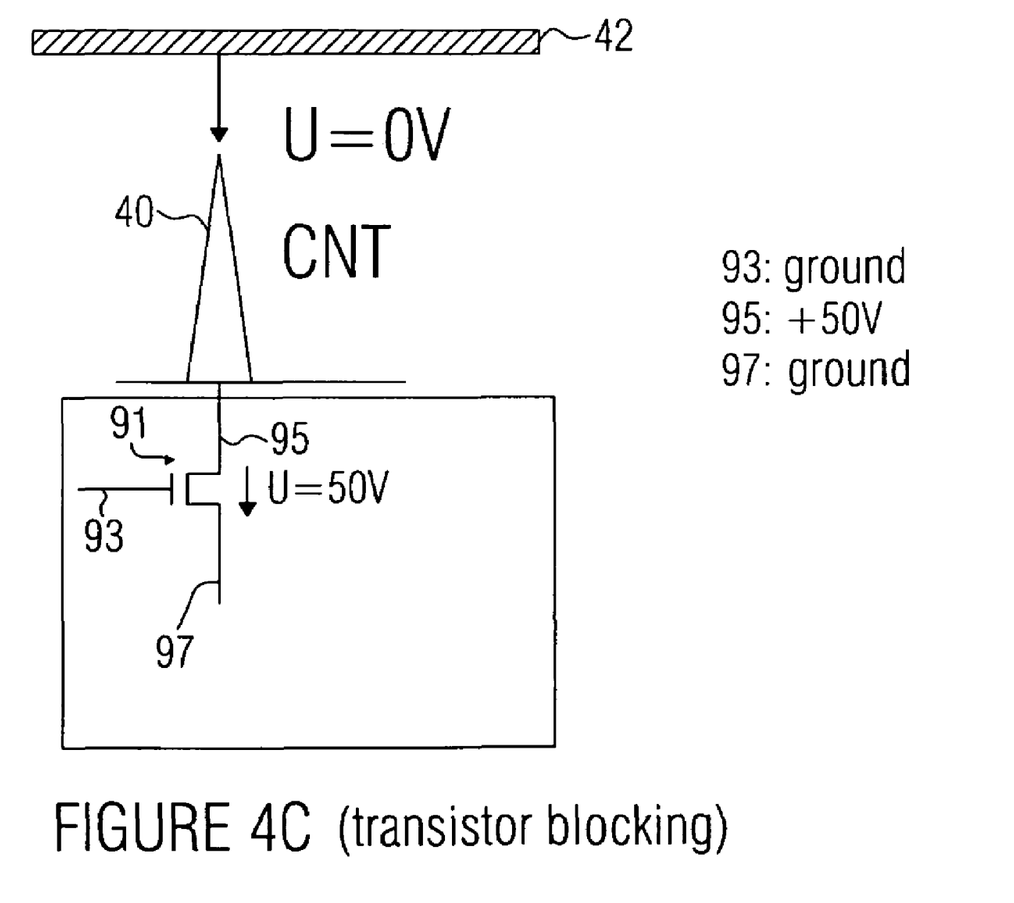

In contrast, FIG. 4c shows the situation where the control input 93 of the transistor 91 is at ground (0 V), i.e. the transistor is blocking. In this case, there is no voltage drop between the substrate 42 and the CNT, which is why no electrons are emitted from the CNT. The voltage of +50 V, however, drops between the node 95 and the node 97, the node 97 being at a reference potential, such as, for example, ground.

The voltage at the substrate 42 has a magnitude of typically several 10 volts up to 50V, which is sufficient to cause the electrons to leave the tip of a source including the electron-emitting device, due to the field emission. In the CNT 40, this source includes several mostly cylindrical carbon elements having a diameter of several nanometers arranged on a substrate.

A voltage for controlling the conductivity of the transistor 91 is applicable to the control input 93, as is shown in FIGS. 4b and 4c. When this voltage is applied, the, for example, self-blocking transistor 91 will be "switched on" and the excitation current flowing into the input 95 will be passed on to the output 97. If the transistor 91 itself is conducting, it will be "switched off" by the voltage applied, which causes the excitation current to cease flowing.

If the control input 93 is connected to ground M, the transistor 91 will transit into a blocking state and will thus switch off the excitation current. Only optionally, a capacity C1 serving to "store" the voltage at the node 93 of the transistor 91 is placed between the control input 93 and ground M.

The means 9 for switching off the excitation current further includes an optional switch 99 which is connected between the control input 93 and ground M and further includes a control input 9901. The switch is closed or opened depending on a signal at this control input. This is how the control input 93 can, independent of the charge stored on the capacitor C1, be connected to ground M so that the, for example, self-blocking transistor 91 is switched off quickly and the capacitor C1 is discharged quickly, which is required for obtaining a high resolution.

The embodiment illustrated in FIG. 2 also includes means 11 for generating at least an auxiliary current. The means 11 is of particular advantage when the excitation current is to be measured as precisely as possible and thus should not be corrupted. If there is a predetermined relation between the auxiliary current and the excitation current, both the current threshold value and the charge threshold value can be determined on the basis of this auxiliary current.

The means 11 for generating at least one auxiliary current can, for example, include a current mirror 1101 having a first input 1103, a second input 1105 and a third input 1107 and an output 1109 connected to ground M. The first input 1103 of the current mirror 1101 is connected to the output 97 of the transistor 91 so that the excitation current can flow into this first input and can generate two auxiliary currents flowing into the second input 1105 and the third input 1107, respectively.

The auxiliary current flowing into the second input 1105 of the current mirror 1101 is, in the embodiment illustrated in FIG. 2, used by the means 7 for determining the charge threshold value. The means 7 additionally includes a first comparator 71 having a first input 7101, a second input 7103 and an output 7105. A predetermined reference voltage which can be used for determining the charge threshold value can be applied to the input 7101. The second input 7103 of the comparator 71 is connected, via a capacity 73, to a supply voltage source providing a supply voltage $V_{DD}$. The capacity 73 serves to integrate the auxiliary current flowing into the second input 1105 of the current mirror 1101, the auxiliary current being in a predetermined relation to the excitation current, so that a voltage which is proportional to the charge transported by the auxiliary current is at the second input 7103 because of the known relations (charge=integral I dt and voltage=1/C integral I dt, C describing the value of the capacity 73).

The comparator 71 compares the voltages at the two inputs 7101 and 7103 and provides a result of this comparison to its output 7105. If the voltage at the second input 7103 is greater than that at the first input 7101, this means that the capacity has already drawn a certain amount of charge exceeding a charge threshold value.

It is to be pointed out here that the capacity 73 mentioned may be replaced by any functionality having an integral behavior, such as, for example, a suitably connected operational amplifier.

In parallel to the capacity 73, a switch 75 can be connected to a control input 7501, serving to discharge the capacity 73 by bridging before a new emission process of the electron-emitting device.

The embodiment illustrated in FIG. 2 additionally includes a second comparator 51 having a first input 5101, a second input 5103 and an output 5105. A reference voltage which can be used for determining the current threshold value is applicable to the input 5101. The second input of the comparator is, in this embodiment, connected to the third input 1107 of the current mirror 1101 into which another auxiliary current being in a predetermined relation to the excitation current flows. The second input 5103 of the comparator 51 is also connected to the voltage source providing the voltage $V_{DD}$ via a resistor. The auxiliary current through this resistor results in a voltage at the second input 5103 which is compared to the reference voltage at the first input 5101. If this voltage is smaller than the reference voltage at the first input 5101, this means that the magnitude of the auxiliary current has fallen below a current threshold value represented by the voltage across the resistor 53. In this case, there is an output signal at the output 5105 of the comparator 51 indicating that the value has fallen below the current threshold value.

It is to be pointed out here that the resistor 53 may be replaced by any functionality which can transform a current into a voltage, such as, for example, a current-controlled voltage source.

In the embodiment illustrated in FIG. 2, the outputs of the comparators 71 and 51 are connected to the inputs 1301 and 1303, respectively, of a logic 13 which also includes a first output 1305 and a second output 1307. The logic 13 is formed such that the signals at its inputs can be combined or evaluated using a suitable operation, such as, for example, an OR operation, and the result of this operation is at the first input 1305 also connected to the control input 9901 of the switch 99. If there is a value below the current threshold value or if the charge threshold value is exceeded, the switch 99 will be closed due to the signal at the first input 1305 of the logic 13 so that the transistor 91 transits to the blocking state and switches off the excitation current. The two output signals of the comparators 71 and 51 are also combined with each other in logic 13 such that the (high-voltage) transistor 91 will be opened when the dose, i.e. the amount of charge emitted, has the correct value or the magnitude of the current has not exceeded the current threshold value.

The signal at the second output 1307 of the logic 13 is optional and can, for example, be fed to another superordinated monitoring means. This is of particular advantage when several electron-emitting devices 1 are arranged in an array, wherein each electron-emitting device may comprise an inventive control circuit. The signal at the second output 1307 of logic 13 provides the identification feature associated to each control circuit, which unambiguously identifies the electron-emitting device in the array forming a multi-electron-emitting device. Using this identification feature, the superordinated monitoring means can monitor a plurality of control circuits in order to deactivate, for example, the respective control circuit when a value falls below the current threshold value.

Figure 3:
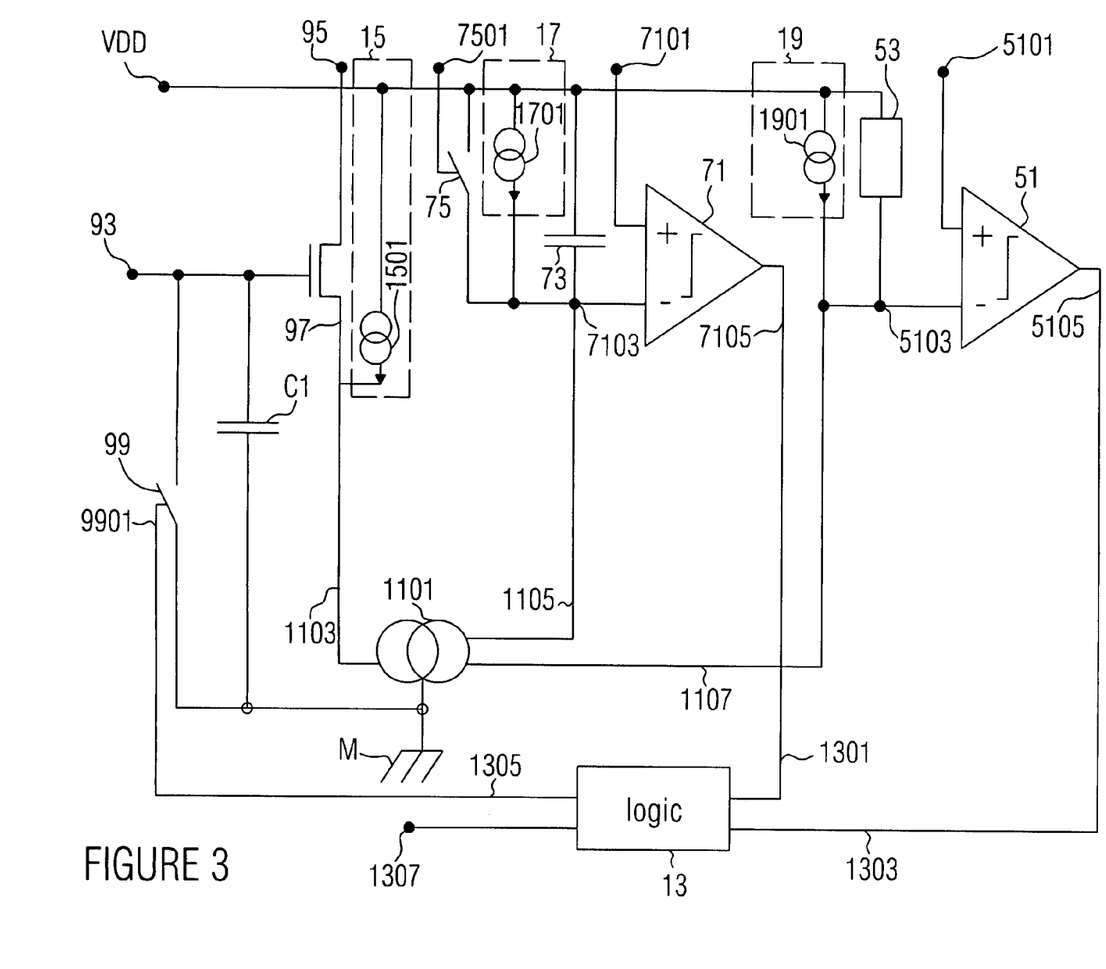
FIG. 3 shows another embodiment of the inventive control circuit.

FIG. 3 shows another embodiment of the control circuit for controlling an electron-emitting device. Since this embodiment has a number of functionalities already included in the embodiment illustrated in FIG. 2, the functionalities having the same reference numerals will not be described again.

In contrast to the embodiment illustrated in FIG. 2, means 9, illustrated in FIG. 3, for switching off the excitation current additionally includes a current providing device 15 serving to counteract the so-called clock punch-through effect. This effect can be attributed to a very fast steep change of a node potential, this change resulting in potential variations during and shortly after switching even in the neighboring nodes, which can be attributed to parasitic coupling elements, such as, for example, a coupling capacity of the nodes. Here, the size and the duration of the potential variation are also determined by the current flowing through a neighboring current. In particular, this means that there is a particularly strong clock punch-through with currentless nodes provided with a current. Additionally, excitation current losses result since the parasitic capacities are, for example, recharged by the excitation current. In order to avoid this effect as far as possible, an identical bias current is led into all the branches such that the measurement of the switched-on current using a potential drop and the integration of the current for measuring the charge will not be corrupted. In the inventive embodiment, a constant (bias) current is permanently led into the circuit in the node "below" the transistor 91.

The current-providing device 15 in this embodiment includes a current source 1501, to the input of which a voltage is appicable, such as, for example, the voltage $V_{DD}$, connected in parallel to the transistor 91 such that a recharge current output by this current source is superimposed on the excitation current through the transistor 91. This recharge current provided by the current source 1501 is used for recharging the parasitic coupling capacities already mentioned so that no excitation current is lost for this. This is of particular importance during switching on the means for switching off the excitation current 9 since here the switch 99 is opened and a predetermined voltage is applied to the control input 93 so that the transistor 91 is switched on and thus becomes conducting. If the current-providing device 15 feeding a recharge current, which can be predetermined, into the node 97 was dispensed with, a portion of the excitation current would have to be used for recharging the parasitic capacities so that the means 9 would only transit to its stationary state after a certain time. Without such a current-providing device 15, a portion of the current could not be measured during this switching so that neither the current threshold value nor the charge threshold value could be determined to a sufficiently precise degree, which, however, is required so that, for example, the amount of charge emitted by the electron-emitting device can be dosed selectively, which is how a high resolution can be obtained.

The current fed to the node 97 by the current-providing device 15 also serves to recharge the parasitic capacities mentioned so that the stationary state thereof settles faster when switching on the means 9.

It is to be pointed out here that the realization of the current-providing device 15 by means of the current source 1501 only represents one of the possible embodiments. In general, the recharge current can be generated using any functionality which can provide a recharge current, such as, for example, a suitably connected current mirror or a voltage-controlled current source.

The embodiment illustrated in FIG. 3 additionally includes another current-providing device 17 providing, to the means 7 for determining the charge threshold value, another current depending on the recharge current provided by the current-providing device 15. In the embodiment illustrated in FIG. 3, the current-providing device 17 includes a current source 1701, the output of which is connected to the node 7103 and which is connected in parallel to the capacity 73.

It is to be pointed out here that the current source 1701 used in this embodiment for realizing the current-providing device 17 only represents one possible form for realizing a current-providing device 17. In principle, the current-providing device 17 can be realized using any functionality providing a current depending on the recharge current provided by the current-providing device 15.

Additionally, the embodiment illustrated in FIG. 3 includes another current-providing device 19 for feeding, to the means 5 for determining the current threshold value, another current depending on the recharge current impressed by the current-providing device 15. In this embodiment, the current-providing device 19 includes a current source 1901, the output of which is connected to the node 1503 and to the input of which a voltage, such as, for example, the voltage $V_{DD}$, is applicable.

It is to be pointed out here that the current-providing device 19 can be realized in many different ways, as has already been discussed for the current-providing device 17.

The currents provided by the current-providing device 17 and the current-providing device 19 serve to consider the recharge current superimposed on the excitation current in the switched-on state of the switching-off device 9, impressed by the current-providing device 15, such that both the magnitude of the excitation current and the amount of charge emitted can be determined in an uncorrupted and thus sufficiently precise way.

According to the embodiments illustrated in FIGS. 2 and 3, the entire electronics, from an electrical point of view, is at ground and operates with a voltage $V_{DD}$ UP to 5V which is usual for IC technologies. The transistor 91 can be formed as a high-voltage transistor the drain of which is at a considerably higher voltage than the positive supply voltage.

The embodiments illustrated in FIGS. 2 and 3 may additionally comprise a regulating circuit formed such that the voltage applicable to the control input 93 of the transistor 91, which can be interpreted as an input signal, resets the logic 13. The charge of the capacitor is set to zero via a reset signal applicable to the control input 7501 of the switch 75, the transistor 91 is closed and the comparator 51 is switched on via a predefined delay. The comparator 51 will only be switched on after a delay in order for the stationary excitation current to be monitored. The comparator 51 at first checks, after the defined delay, whether there is a minimum excitation current. The comparator 71 thus monitors the voltage difference over the capacity 73 on the basis of the mirrored and integrated excitation current. The two output signals of the comparators 51 and 71 are evaluated suitably in the logic 13 and a corresponding output signal (Out) at the output 1307 is derived for processing. Then, the switch 99 will be opened so that there is no longer an excitation current through the transistor 91 nor through an electron source.

Another aspect of the present invention relates to an array for controlling a multi-electron-emitting device. The latter includes a plurality of electron-emitting devices which are arranged in an array and can be controlled, either individually or, when united to form small groups, as groups, by the inventive control circuit. When the multi-electron-emitting device, for example, includes CNTs, it is important for a high resolution and for a quick generation of a structure that the amount of charge emitted by the CNTs or by the CNT groups can be dosed to a sufficiently precise degree. If the CNTs are defect, i.e. if either no electrons are emitted or if the required amount of charge cannot be obtained within a time interval, the CNTs must be switched off in order not to result in incomplete structural points, which can be obtained by deactivating the control circuit and thus switching off the excitation current.

Due to the problems described above, each electron-emitting device of the multi-electron-emitting device, according to the invention, has an identification feature identifying it unambiguously, such as, for example, an address formed on the basis of the array coordinates. Additionally, it is necessary that each electron-emitting device can inform a superordinated monitoring means about its present operating state, such as, for example, whether the magnitude of the excitation current has reached a predetermined current threshold value. The inventive embodiments shown in FIGS. 2 and 3 include the logic 13 at the second output 1307 of which this information is made available to the superordinated monitoring means. If, for example, the magnitude of the excitation current does not reach the predetermined current threshold value, the inventive comparator 51 will provide a corresponding output signal so that, after a suitable evaluation of the two output signals of the comparators 51 and 71 by the logic 13, there is a corresponding signal at the output 1307 indicating for the superordinated monitoring means that the magnitude of the current is below the current threshold value so that the control circuit of the corresponding electron-emitting means will be deactivated.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A control circuit for controlling an electron-emitting device formed to draw, with a voltage applied, an excitation current being related to a number of electrons emitted, comprising:
    a first determinator for determining whether an amount of charge transported by the excitation current has reached a predetermined charge threshold value;
    a second determinator for determining whether a magnitude of the excitation current has reached a predetermined current threshold value; and
    a switch for switching off the excitation current as soon as the first determinator determines that the amount of charge has reached a predetermined charge threshold value, or as soon as the second determinator determines that the magnitude of the excitation current is smaller than the predetermined current threshold value.

2. The control circuit according to claim 1, further comprising:
    a generator for generating at least one auxiliary current being in a predetermined relation to the excitation current, wherein the first determinator and/or the second determinator are/is formed to operate on the basis of at least one auxiliary current.

3. The control circuit according to claim 1, wherein the first determinator comprises:
    a comparator having a first input and a second input and an output, wherein a reference voltage used for determining the charge threshold value is at the first input; and
    a capacity for drawing an amount of charge transported by the auxiliary current, which is proportional to the amount of charge transported by the excitation current, connected to the second input of the comparator and another voltage source.

4. The control circuit according to claim 3, further including a controllable switch connected in parallel to the capacity, which can be closed after a certain emission time of the electron-emitting device to discharge this capacity.

5. The control circuit according to claim 3, wherein the second determinator comprises:
    a comparator having a first input and a second input, wherein a reference voltage used for determining the charge threshold value is applicable to the second input;
    a current-voltage transformer connected to a voltage source and to the second input of the comparator, formed to transform an auxiliary current into a voltage applicable to the first input of the comparator.

6. The control circuit according to claim 5, wherein the current-voltage transformer is a resistive element.

7. The control circuit according to claim 1, wherein the switch for switching off the excitation current comprises:
    a transistor having a control input, an input and an output, wherein a voltage, the magnitude of which does not fall below a value required for the electron emission of the electron-emitting device is applicable to the input.

8. The control circuit according to claim 7, including a capacity connected between the control input of the transistor and ground to permanently store a control voltage applied.

9. The control circuit according to claim 2,
    wherein the generator for generating at least one auxiliary current includes a current mirror having a first input, a second input and a third input and an output, the first input being connected to the output of the transistor;
    wherein the second input is connected to the second input of the comparator;
    wherein the third input is connected to the second input of the comparator); and
    the current mirror being formed to generate, depending on a current flowing into the first input, a first auxiliary current flowing into the second input;

the current mirror being formed to generate, depending on the current flowing into the first input, a second auxiliary current flowing into the third input; and wherein the output is connected to ground.

10. The control circuit according to claim 1, including a logic circuit formed to combine an output signal of the second determinator for determining the current threshold value and an output signal of the first determinator for determining the charge threshold value by means of an OR operation and to make available the result of this OR operation to the switch for switching off the excitation current.

11. The control circuit according to claim 10, further formed to make available the result of the OR operation, together with an identification feature of the control circuit, to a superordinated monitor.

12. The control circuit according to claim 1, wherein the switch for switching off the excitation current comprises a first node and a second node, wherein the first node is connectable to a voltage applied and a conducting connection can be established between the first and second nodes by switching on, wherein the second node is connected to a current-provider formed to feed a recharge current to the second node in a switched-off state of the switch for switching off the excitation current.

13. The control circuit according to claim 12, further including a current-provider formed to feed to the first determinator for determining the charge threshold value a current depending on the recharge current in a switched-on state of the switch for switching off the excitation current.

14. The control circuit according to claim 12, further including a current-providing device formed to feed to the second determinator for determining the current threshold value a current depending on the recharge current in a switched-on state of the switch for switching off the excitation current.

15. A method for controlling an electron-emitting device formed to draw, with a voltage applied, an excitation current being related to a number of electrons emitted, comprising the steps of:

determining whether an amount of charge transported by the excitation current has reached a predetermined charge threshold value;

determining whether a magnitude of the excitation current has reached a predetermined current threshold value; and switching off the excitation current as soon as it is determined that the amount of charge has reached a predetermined charge threshold value, or as soon as it is determined that the magnitude of the excitation current is smaller than the predetermined current threshold value.

16. An array for controlling a multi-electron-emitting device, the multi-electron-emitting device comprising a plurality of electron-emitting devices, comprising:

a plurality of control circuits for controlling an electron-emitting device formed to draw, with a voltage applied, an excitation current being related to a number of electrons emitted, comprising: a first determinator for determining whether an amount of charge transported by the excitation current has reached a predetermined charge threshold value; a second determinator for determining whether a magnitude of the excitation current has reached a predetermined current threshold value; and a switch for switching off the excitation current as soon as the first determinator determines that the amount of charge has reached a predetermined charge threshold value, or as soon as the second determinator determines that the magnitude of the excitation current is smaller than the predetermined current threshold value, one control circuit being provided for one electron-emitting device;

wherein an identification feature unambiguously identifying the electron-emitting device in this array is associated to each control circuit; and a monitor for monitoring the plurality of control circuits formed to detect whether, in a control circuit, the magnitude of the excitation current has reached a predetermined threshold value;

wherein the monitor is formed to effect a permanent deactivation of the control circuit on the basis of the identification feature.

* * * * *